United States Patent
Frank et al.

(10) Patent No.: US 10,179,612 B2
(45) Date of Patent: Jan. 15, 2019

(54) BODY APERTURE PLUG AND BODY CONVERSION

(71) Applicant: Ford Global Technologies, LLC, Dearborn, MI (US)

(72) Inventors: Steven Frank, Dearborn, MI (US); Maciej Bednarek, Windsor (CA); James Yoos, Southgate, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 99 days.

(21) Appl. No.: 15/255,188

(22) Filed: Sep. 2, 2016

(65) Prior Publication Data
US 2018/0065687 A1     Mar. 8, 2018

(51) Int. Cl.
B62D 25/24      (2006.01)
B60R 13/00      (2006.01)
B60R 13/08      (2006.01)

(52) U.S. Cl.
CPC .............. B62D 25/24 (2013.01); B60R 13/00 (2013.01); B60R 13/0846 (2013.01)

(58) Field of Classification Search
CPC ......... B60R 13/00; B60R 13/02; B60R 13/04; B62D 25/14; B62D 25/24
USPC ....................................................... 296/1.06
See application file for complete search history.

(56) References Cited

U.S. PATENT DOCUMENTS

| | | | |
|---|---|---|---|
| 4,363,420 A | 12/1982 | Andrews | |
| 4,391,384 A * | 7/1983 | Moore, III | B62D 25/24 220/315 |
| 4,588,105 A * | 5/1986 | Schmitz | B29C 65/02 220/359.4 |
| 5,103,660 A | 4/1992 | Johnson | |
| 5,852,854 A | 12/1998 | Pierrot et al. | |
| 6,319,436 B1 * | 11/2001 | Jaeger | B29C 44/0461 264/255 |
| 2003/0093955 A1 | 5/2003 | Helferty | |
| 2012/0097337 A1 | 4/2012 | Dominguez et al. | |

FOREIGN PATENT DOCUMENTS

| | | |
|---|---|---|
| DE | 102006053265 A1 | 5/2008 |
| EP | 0911132 A2 | 4/1999 |
| FR | 2792700 A1 | 10/2000 |
| JP | H0725362 A | 1/1995 |
| JP | H0942467 A | 2/1997 |
| JP | 2001097230 A | 4/2001 |
| WO | 2015187239 A1 | 12/2015 |

OTHER PUBLICATIONS

UK Search Report dated Oct. 30, 2017; GB Appl. No. 17138363.

* cited by examiner

*Primary Examiner* — Jason S Daniels
(74) *Attorney, Agent, or Firm* — Frank A. MacKenzie; Bejin Bieneman PLC

(57) ABSTRACT

A plug for a body aperture in a vehicle body includes a base, a locating surface and a lip portion of the base. The base is shaped and sized to completely overlap the aperture. The locating surface is disposed on a first side of the base, extending substantially normal to the base. The locating surface is complementary in shape to the aperture for receipt thereby. The lip portion connects the locating surface with an outer perimeter of the base. A receiving groove is disposed in the lip portion.

20 Claims, 16 Drawing Sheets

BODY APERTURE PLUG AND BODY CONVERSION

BACKGROUND

Non-autonomous vehicle body panels such as a bulkhead present a plurality of apertures enabling passage of human interface components for control of a vehicle, such as a steering column, through the bulkhead. Such apertures may not be required in autonomous vehicles, e.g., an autonomous vehicle that does not include a steering column does not need an aperture through the bulkhead for the steering column. For purposes of this disclosure, an autonomous vehicle is one in which each of a vehicle's propulsion, braking and steering are controlled by an on-board electronic control unit that includes programming to autonomously operate the vehicle.

DETAILED DESCRIPTION

Introduction

An example system includes a plug for a body aperture in a vehicle body including a base, a locating surface and a lip portion of the base. The base is shaped and sized to completely overlap the aperture. The locating surface is disposed on a first side of the base, extending substantially normal to the base. The locating surface is complementary in shape to the aperture for receipt thereby. The lip portion connects the locating surface with an outer perimeter of the base. A receiving groove is disposed in the lip portion.

Relative orientations and directions (by way of example, upper, lower, bottom, rearward, front, rear, back, outboard, inboard, inward, outward, lateral, let, right) are set forth in this description not as limitations, but for the convenience of the reader in picturing at least one embodiment of the structures described.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Exemplary System

To facilitate the use of a non-autonomous vehicle body for use as a vehicle body for an autonomous vehicle, it is desired to permanently plug or block certain of the body apertures with rigid plugs. Such plugs may provide a stiffness similar to that provided by the deleted component, and may resist attempts to re-work of an autonomous vehicle into a non-autonomous vehicle.

Figure 1:
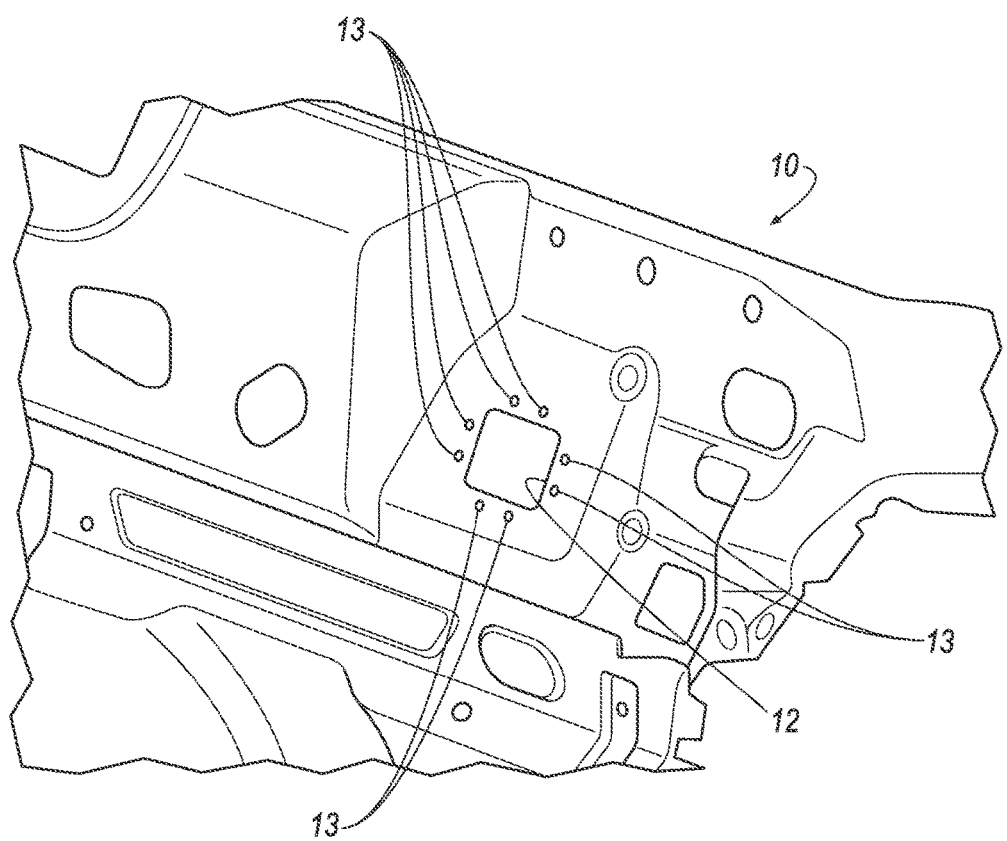
FIG. 1 illustrates an example body aperture in an example body panel.

As illustrated in FIG. 1, non-autonomous vehicle body panels such as a bulkhead 10 present a plurality of apertures enabling the extension of human interface components for control of the vehicle, such as a steering column (not shown), through a body panel 10, more specifically a bulkhead 10. Bulkhead 10 may be formed of, by way of example, steel, or aluminum, or a composite material such as a carbon fiber reinforced polymer. Other such control components or systems may include brake and accelerator control pedal systems (not shown) and transmission gear selection mechanisms (not shown). A body aperture 12 for receiving a feature such as a steering column (not shown) is steering column pass-through aperture 12. Aperture 12 of FIG. 1 is surrounded by a plurality of fastener apertures 13 for receiving fasteners (not shown) that fix a steering column to bulkhead 10.

Figure 2:
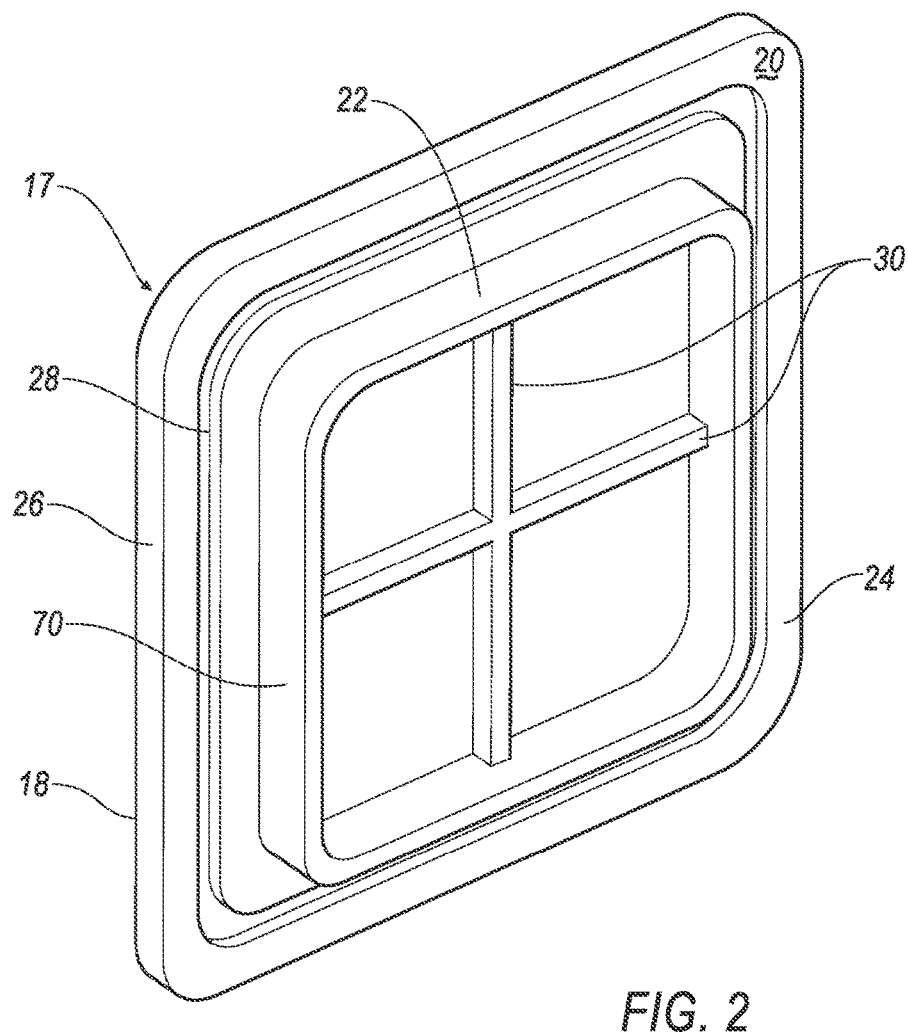
FIG. 2 is a perspective view of an example plug.

A body conversion system 16 may be use to convert a vehicle body, including a vehicle body panel 10 such as bulkhead 10 from a non-autonomous vehicle configuration to an autonomous vehicle configuration. An exemplary plug 17, forming part of the body conversion system 16, is sized and shaped to fit aperture 12 and is illustrated in FIG. 2. Plug 17 may be formed of a nylon 6,6 material. Plug 17 has an exemplary base 18 sized and shaped to completely overlap aperture 12. Base 18 may be but is not required to be substantially the same shape as aperture 12. For example, aperture 12 could be round or oval and base 18 may remain rectangular. A first side 20 of base 18 includes a plug flange 22 extending substantially normal to and from first side 20. Flange 22 is complementary in shape to aperture 12 to facilitate receipt of flange 22 by aperture 12. A lip portion 24 of base 18 is disposed between and connects an outer perimeter 26 of base 18 and flange 22. An adhesive receiving groove 28 is disposed in lip portion 24 on first side 20. Exemplary intersecting reinforcing ribs 30 extend in two directions on first side 20, within and in contact with an inner perimeter of flange 22. Ribs 30 provide structural rigidity to base 18, allowing plug 17 to provide bulkhead 10 with a reinforcing stiffness similar to that which would have been provided to bulkhead 10 by the omitted steering system. A second side 32 of base 18 may present a smooth surface.

Figure 3:
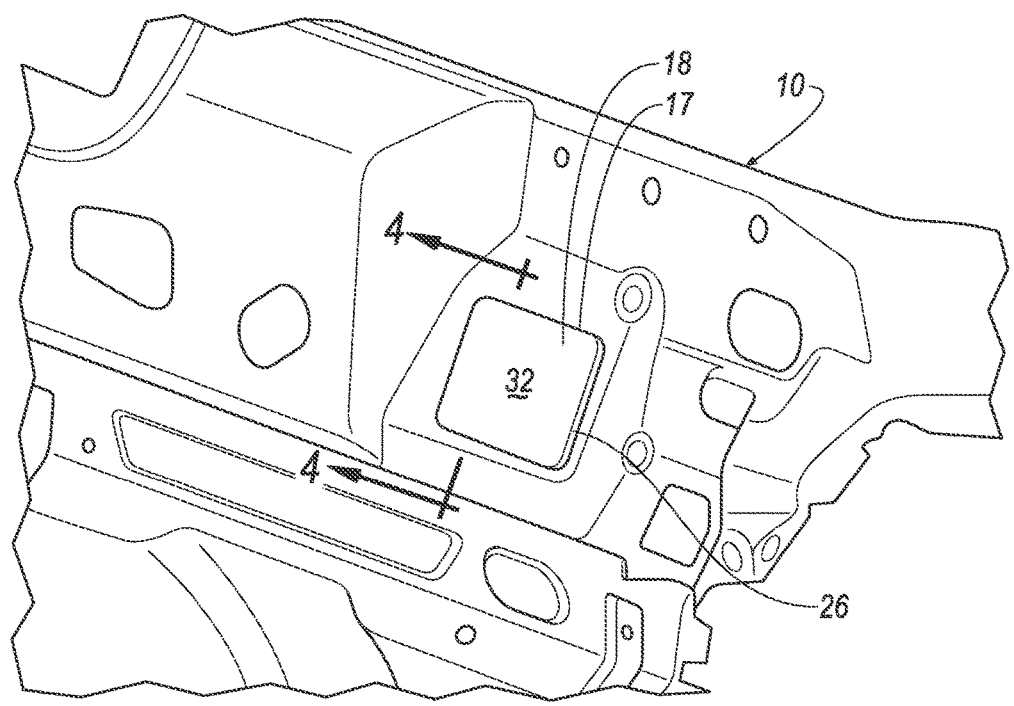
FIG. 3 is illustrates the example plug installed in the example body panel.
Figure 4:
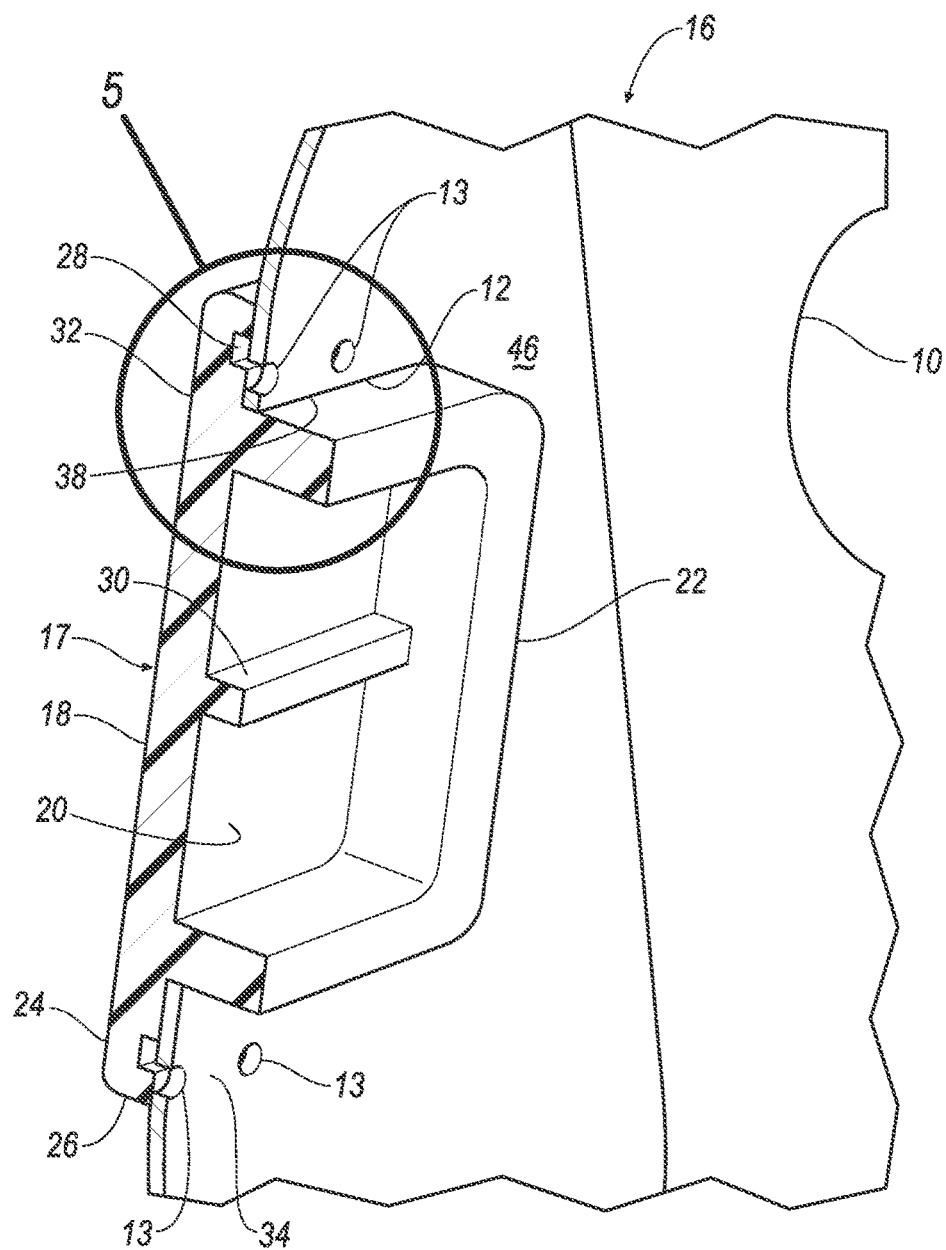
FIG. 4 is a perspective section view taken through an imaginary plane in FIG. 3 normal to arrows 4 and in the direction of arrows 4.
Figure 5:
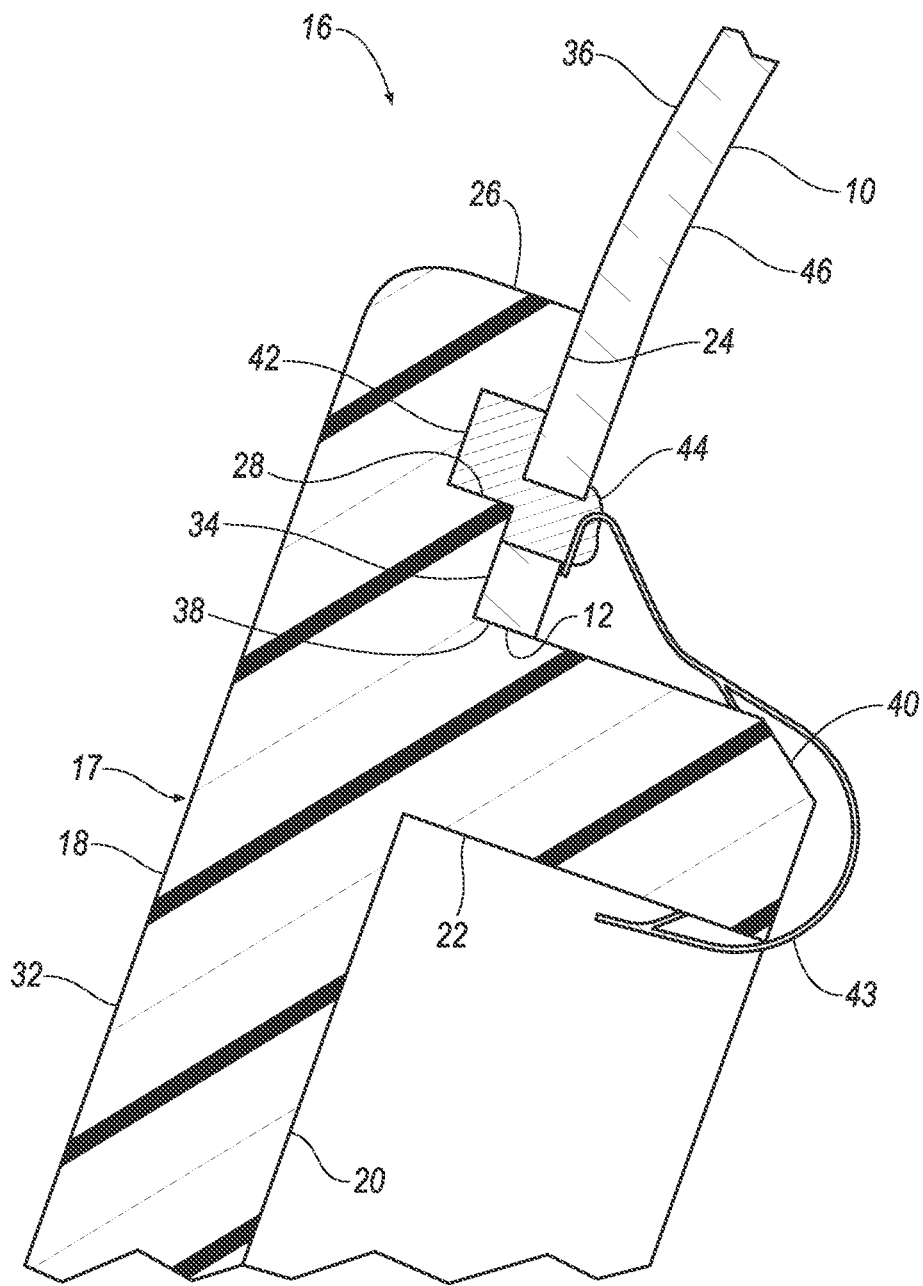
FIG. 5 is a sectional side view in the section of circle 5 of FIG. 4.

Plug 17 is shown in FIG. 3 as disposed in aperture 12 of bulkhead 10 with base 18 disposed on an outside or, in the present example, an engine side, of bulkhead 10. An imaginary section plane A, normal to base 18, passes through plug 17 and bulkhead 10. FIG. 4 shows a section of plug 17 and bulkhead 10 as cut by section plane A, viewed in the direction of arrow 4. Flange 22 extends through aperture 12, past an exemplary lip portion 34 of bulkhead 10. Groove 28 is aligned with and overlies fastener apertures 13. Groove 28 may be circumferentially continuous around lip portion 24, completely encircling flange 22. As better seen in FIG. 5, lip portion 24 extends outwardly beyond flange 22. Lip portion 24 is flush with and engages lip portion 34 of bulkhead 10 on a first side 36 of bulkhead 10. Lip portion 34 defines an inner perimeter 38 of aperture 12. Inner perimeter 38 has a close-fitting relationship with a locating surface 70 of flange 22. Locating surfaces 70 collectively define a larger imaginary locating surface substantially complementary to aperture 12. An outboard chamfer 40 may be formed on flange 22 to further facilitate receipt of flange 22 by aperture 12.

An adhesive 42 is disposed in groove 28. Adhesive 42 may be a thermally expandable structural adhesive. Plug 17 may be installed in bulkhead 10 prior to painting bulkhead 10. Plug 17 is installed in bulkhead 10 by first slipping flange 22 through aperture 12. Plug 17 may be pressed against and clamped to bulkhead 10. An exemplary method of pressing or clamping plug 17 against bulkhead 10 is to install a plurality of retaining clips in the form of spring clips 43 on flange 22. Exemplary clip 43 includes barbs for engaging flange 22. A spring tip is provided on at least a first side of clip 43 for engagement against a second side 46 of bulkhead 10. With plug 17 and bulkhead 10 clamped against each other, a temperature at an interface of lip portion 24 against bulkhead 10 may be increased. The increase in temperature causes thermally expandable adhesive 42 to expand beyond groove 28. The close fitting relationship between flange 22 and inner perimeter 38 resists the flow of adhesive 42 therepast. Engagement of lip portion 24 against lip portion 34, with the clamping force from clips 43, resists the flow of adhesive 42 therepast as well. The expanding adhesive 42 moves through apertures 13, expanding radially beyond apertures 13 upon its exit therefrom. Such radial expansion forms caps 44 over apertures 13 that retain plug 17 against bulkhead 10. Caps 44 supplement an adhesive bonding of adhesive 42 to groove 28 and to a second side 46 of both bulkhead 10 and lip portion 34. Expanded adhesive 42 fills a gap between plug 17 and inner perimeter 38, sealing plug 17 against panel 10.

The base 18 of plug 17 is illustrated as being disposed on a side 46 of panel 10 opposite a passenger cabin. In a completed vehicle, passengers will be seated inside the passenger cabin. If plug 17 is in a location where it is significantly likely that passengers inside the cabin may strike or press against plug 17, the base 18 may be disposed on a side of panel 10 that will be on an inside of the passenger cabin. Such a location will greatly diminish any likelihood that plug 17 might be unintentionally dislodged from panel 10.

Figure 6:
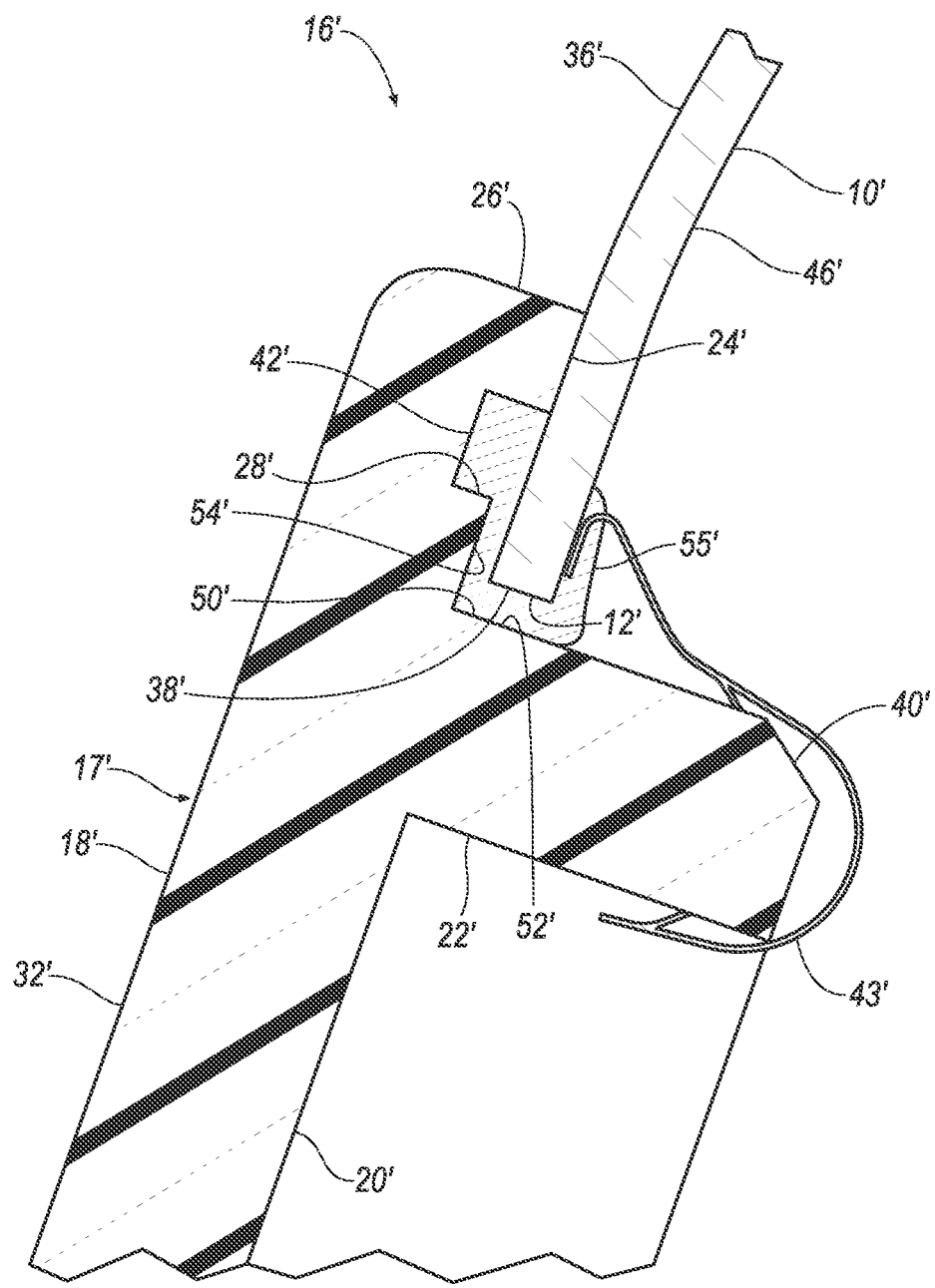
FIG. 6 is a sectional side view of a second example of a plug installed in a body panel.
Figure 7:
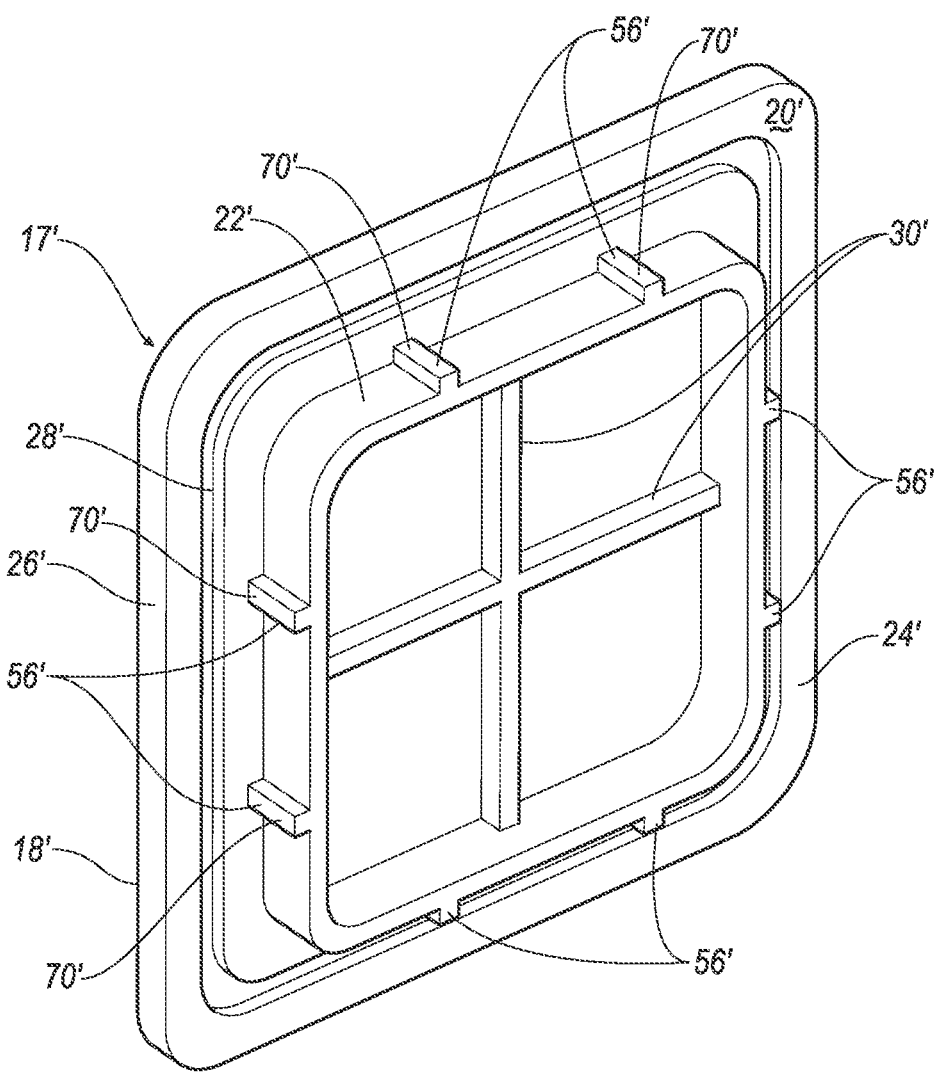
FIG. 7 is a perspective view of the plug of FIG. 6.

A second exemplary embodiment of plug 17 is illustrated in FIG. 6. and FIG. 7. The embodiment of FIG. 6 and FIG. 7 is better suited to arrangements and systems in which apertures such as apertures 13 are not available to receive adhesive 42. The reference numerals used in FIG. 6 and FIG. 7 are used for the same features as those used in FIGS. 1-5, except for the use of a prime or mark for the reference numerals in FIG. 6 and FIG. 7. Reference numerals 50', 52', 54', 55' and 56', not used in FIGS. 1-5, identify features not common to the embodiment of FIGS. 1-5.

An exemplary plug 17' may be much like plug 17 except at the interface of a lip portion 24' with a lip portion 34' and an interface of a flange 22' with an inner perimeter 38'. An adhesive flow channel 50' to accommodate a passage of adhesive 42' is defined in part by maintaining at least a local gap or spacing 52' between inner perimeter 38' and flange 22', and by forming a recess 54' on a first side of base 18' between a groove 28' and flange 22'. Escaping channel 50', adhesive 42' flows over a second side 46' of a body panel 10' forming a retaining stitch 55'. A magnitude of gap 52' and, if so desired, an equalization of gap 52' around an outer perimeter of flange 22', may be controlled by a plurality of spacer bars 56' formed on an outer perimeter of flange 22' as part of flange 22'. Spacer bars 56' may have a close-fitting relationship with aperture 12' with gap 52' being controlled by a thickness of the spacer bars 56'. Spacer bars 56' may provide a locating surface 70' that may engage or be in close proximity to an inner perimeter 38'. A quantity of adhesive 42' that expands beyond channel 50' and across the second side 46' of lip portion 34' may be controlled in part by a width of spacer bars 56'. Making bars 56' wider closes gap 52' by an equal amount, restricting the path of expanding adhesive 42'.

Figure 8:
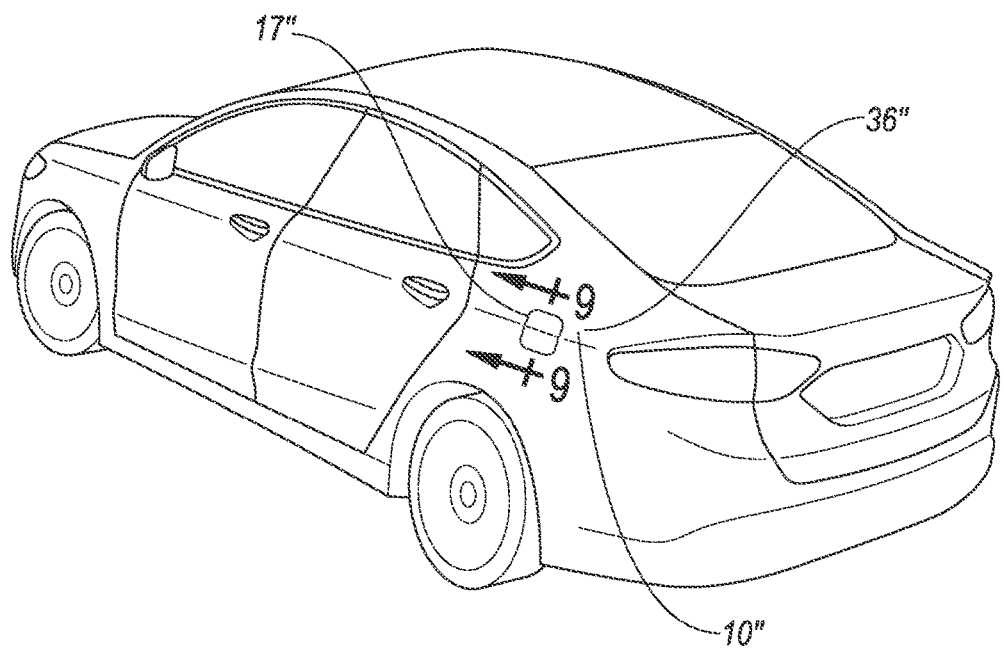
FIG. 8 is a perspective view of a vehicle illustrating an example body panel.
Figure 9:
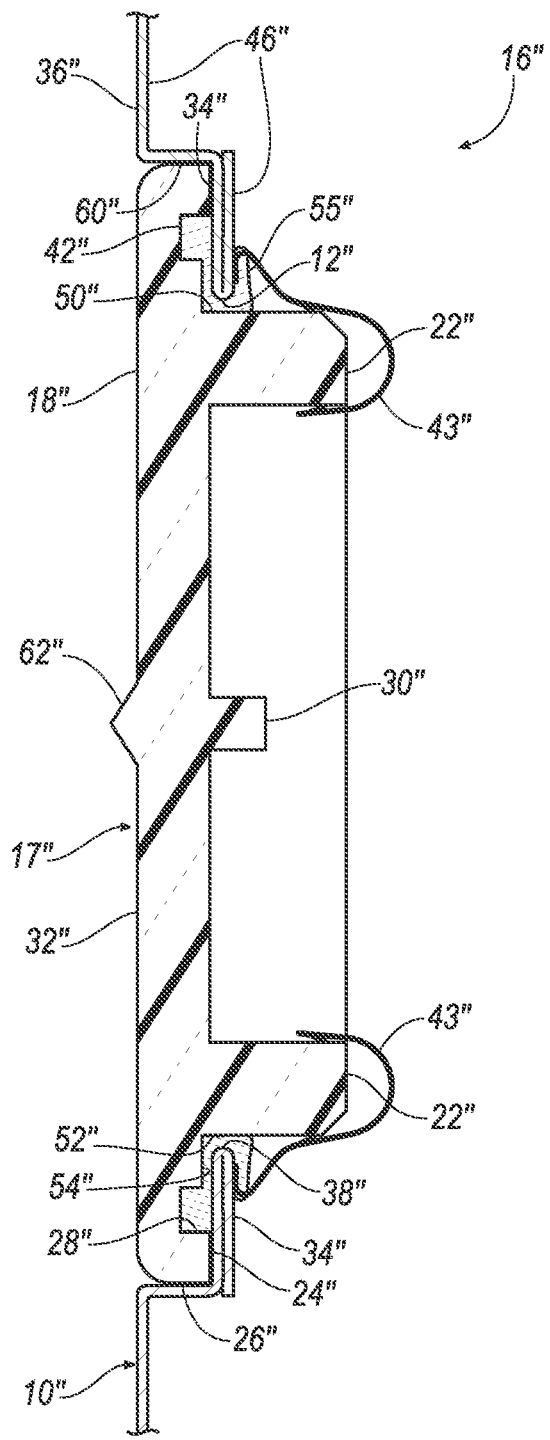
FIG. 9 is a sectional view of a third example of a plug taken through an imaginary plane in FIG. 8 normal to arrows 9 and in the direction of arrows 9.
Figure 10:
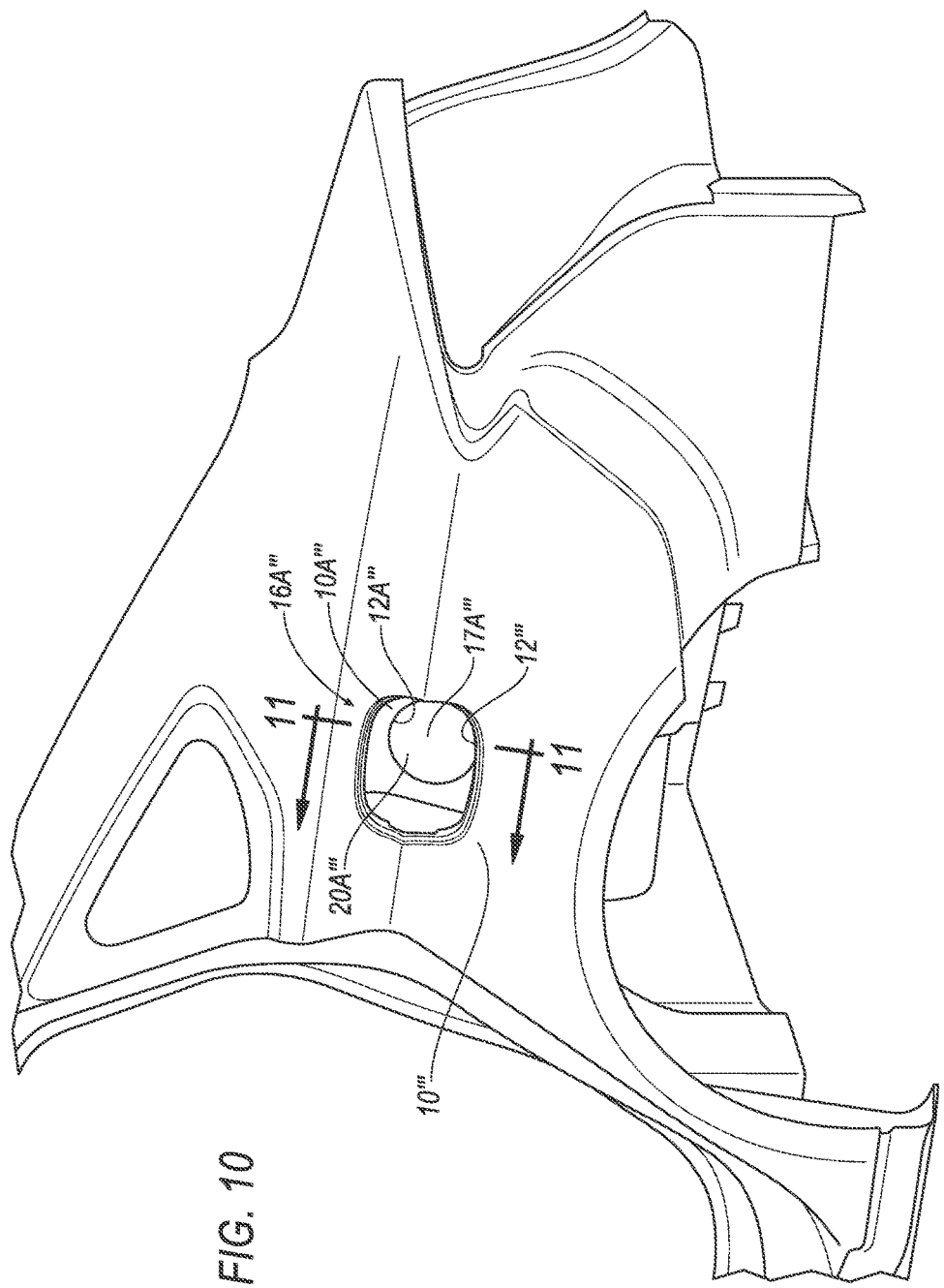
FIG. 10 is a perspective view of a vehicle illustrating fourth example plug installed in an example body panel.
Figure 11:
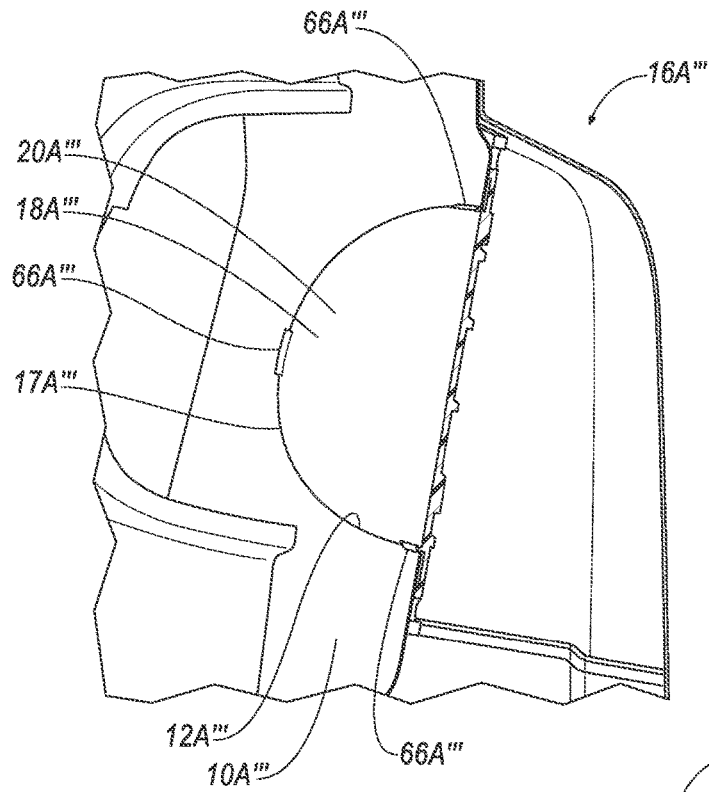
FIG. 11 is a perspective sectional view of the plug and panel of FIG. 10 taken through an imaginary plane in FIG. 10 normal to arrows 11 and in the direction of arrows 11.
Figure 12:
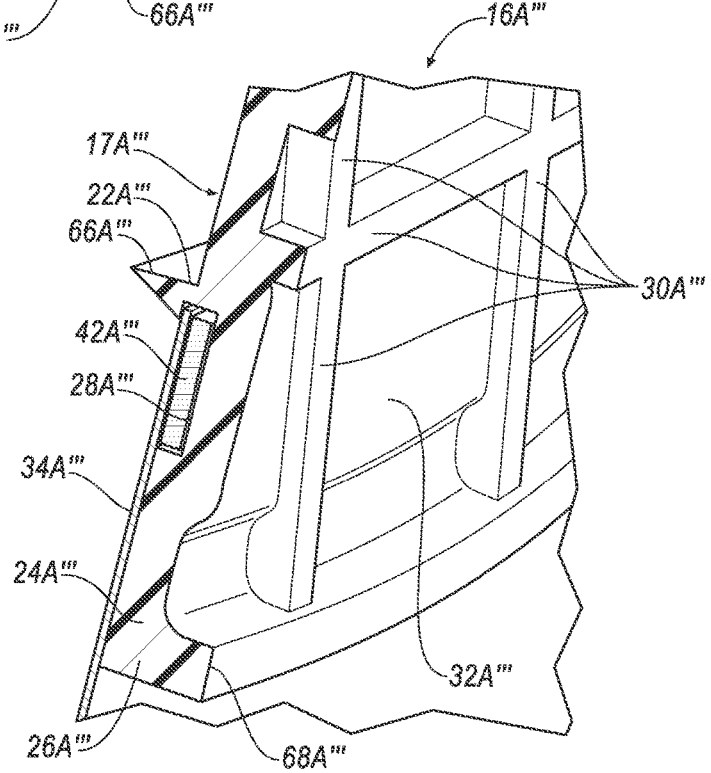
FIG. 12 is a perspective sectional of the plug and panel of FIG. 11 viewed from a second side of a base of the plug.

A third embodiment is illustrated in FIG. 8 and FIG. 9. An exterior body panel 10" of a non-autonomous vehicle may present a body aperture 12" for allowing access to a component disposed on an opposite side of body panel 10", such as a fuel tank filler neck (not shown) through a fuel fill door. Body panel 10" surrounds aperture 12". A plug 17" adapted for use in such an application is illustrated in FIGS. 8 and 9. The embodiment of FIG. 8 and FIG. 9, like that of FIGS. 6 and 7, is well suited to arrangements and systems in which apertures such as apertures 13 are not available to receive adhesive 42, and arrangements and systems in which a second side 32" of a base 18" must be flush with a body panel 10". The reference numerals used in FIG. 8 and FIG. 9 are used for the same features as those used in FIGS. 6 and 7, except for the use of a double prime or "mark for the reference numerals in FIG. 8 and FIG. 9. Reference numerals 60" and 62", not used in FIGS. 1-7, identify features not common to the embodiments of FIGS. 1-7.

Exemplary plug 17" may be much like plug 17'. A first side 20" of a base 18" may be the same as a first side 20' of base 18', possibly excepting the size and the shape of base 18" and a flange 22" as needed to accommodate an aperture 12" in body panel 10". The significant difference is on a second side 32" of base 18" and in the provision of a receiving pocket 60" in body panel 10". Exemplary lip portion 34" of body panel 10" is disposed at a bottom of pocket 60". In FIG. 9, lip portion 34" is illustrated with inner perimeter 38" defined by a folded edge. Providing such a fold is a design choice if there is a need to reinforce lip portion 34". Alternatively, an annular plate or washer (not shown) may be incorporated into lip portion 34" if there is a perceived need for reinforcement. A height or thickness of base 18" is complementary to a depth of pocket 60" such that second side 32" is substantially flush or even with a first side 36" of body panel 10" outside of pocket 60". Second side 32" may include any surface features such as a bead 62" to provide continuity of body lines relative to first side 36" of body panel 10". Base 18" may have a close fitting relationship with pocket 60". Such a relationship between base 18" and pocket 60" may make it unnecessary to have close control over the relationship and relative spacing of flange 22" and inner perimeter 38".

Figure 13:
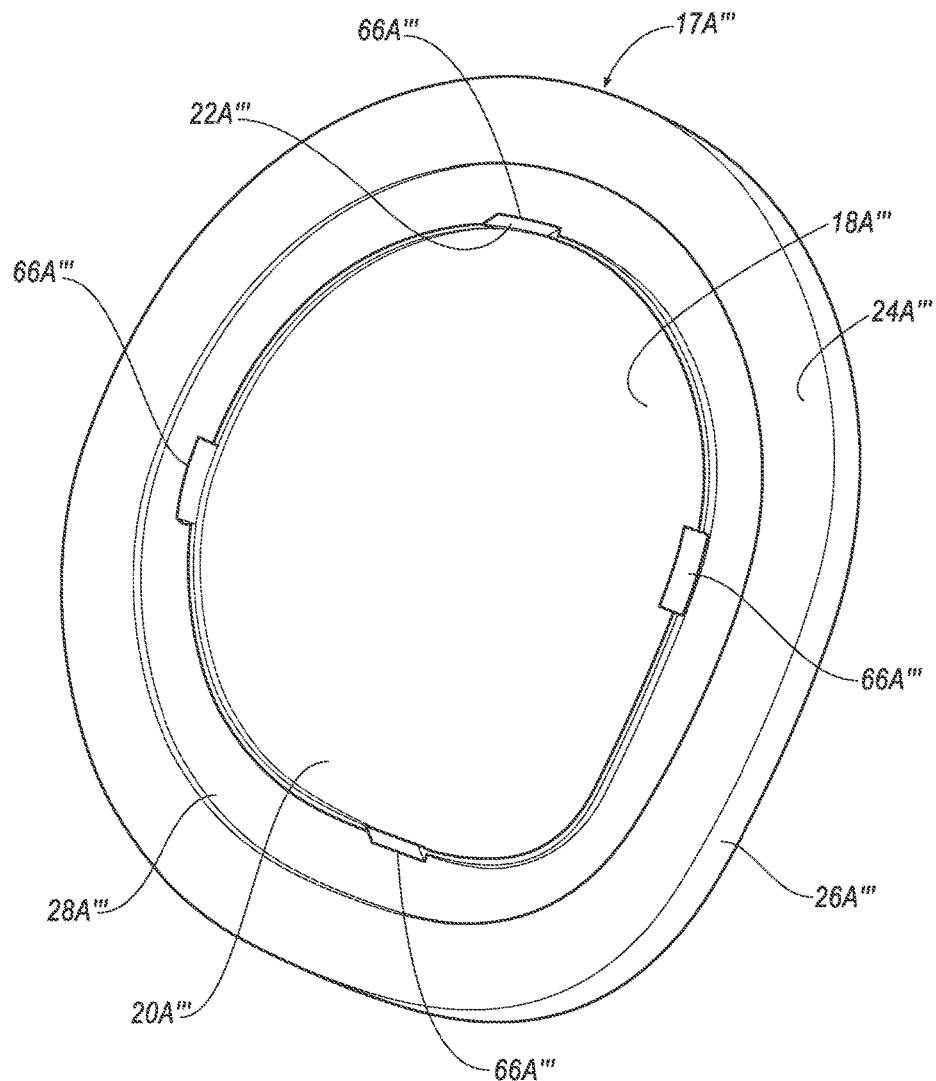
FIG. 13 is a perspective view of a first side of the plug of FIG. 10-FIG. 12.
Figure 14:
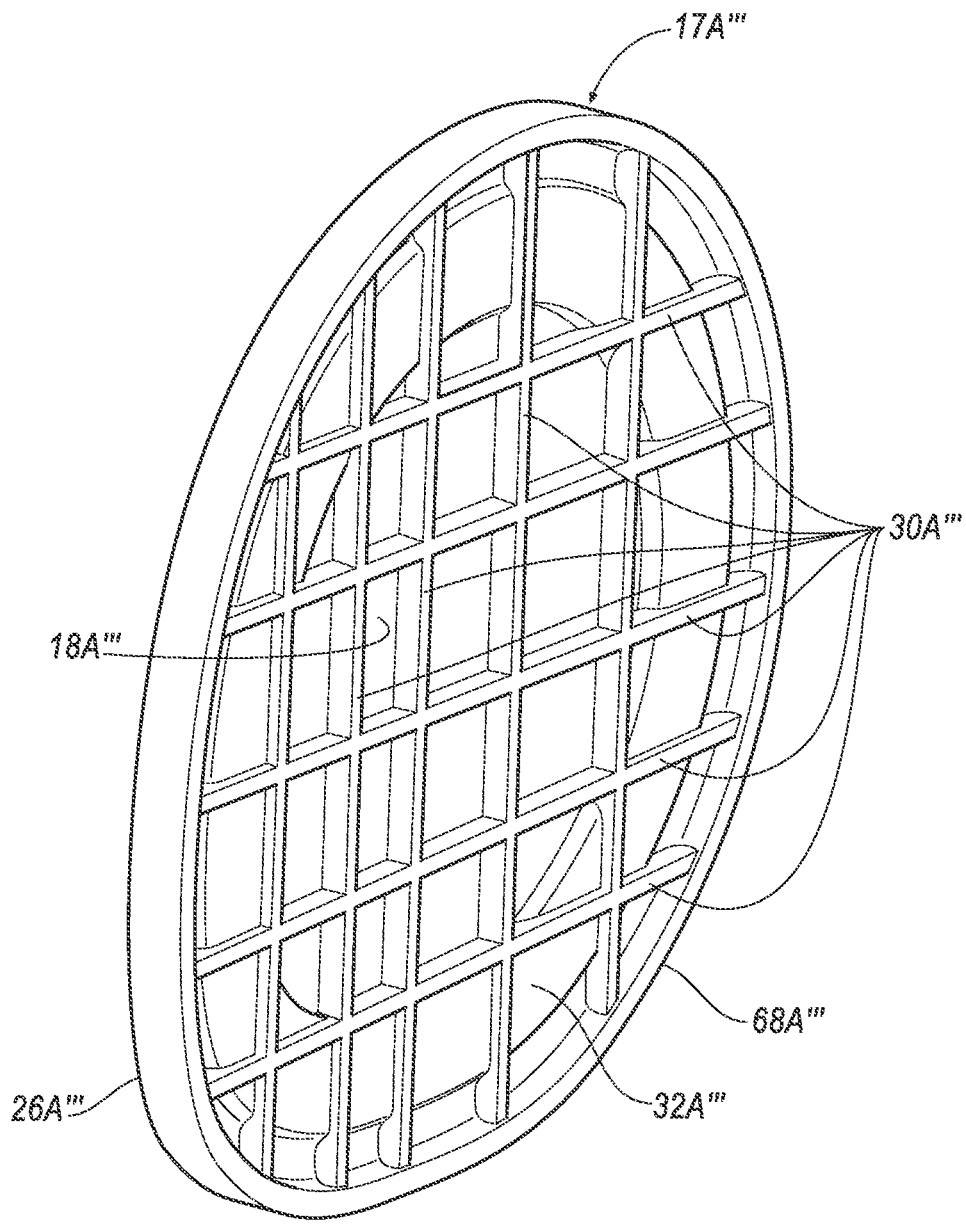
FIG. 14 is a perspective view of a second side of the plug of FIG. 13.

A fourth embodiment is illustrated in FIG. 10 through FIG. 17. An exterior body panel 10''' of a non-autonomous vehicle may present a body aperture 12''' for receipt of a component therethrough, such as a fuel tank filler neck (not shown). An inner body panel 10A''' is disposed inboard of body panel 10''' and has a body aperture 12A''' for receiving, in a non-autonomous vehicle, the fuel tank filler neck. Body panel 10A''' surrounds body aperture 12A'''. A plug 17A''' adapted for use in such an application is illustrated in FIGS. 13 and 14. The embodiment of FIG. 10 through FIG. 17, like that of FIGS. 6 through 9, is well suited to arrangements and systems in which apertures such as apertures 13 are not available to receive adhesive 42. The reference numerals used in FIG. 10 through FIG. 17 are used for the same features as those used in FIGS. 6 and 7, except for the use of a triple prime or ''' mark for the reference numerals in FIG. 10 and FIG. 11 and the use of a suffix "A" for the inner body panel 10A''' and related features to distinguish over an exterior body panel 10''' and related features. Reference numerals 64A''', 66A''', and 68A''', not used in FIGS. 1-9, identify features not common to the embodiments of FIGS. 1-9.

Figure 15:
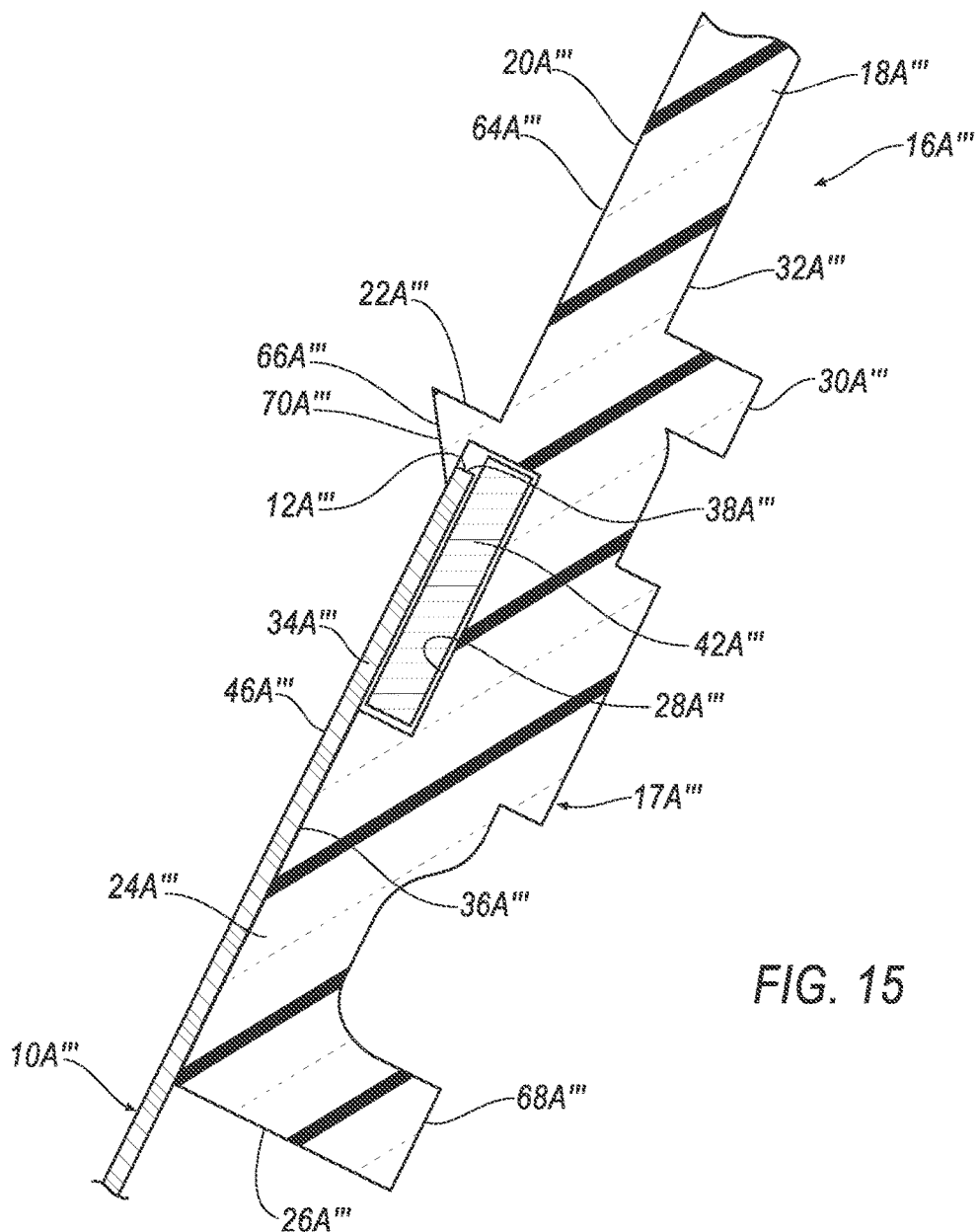
FIG. 15 is a sectional side view of the plug and panel of FIG. 12 before heating.
Figure 16:
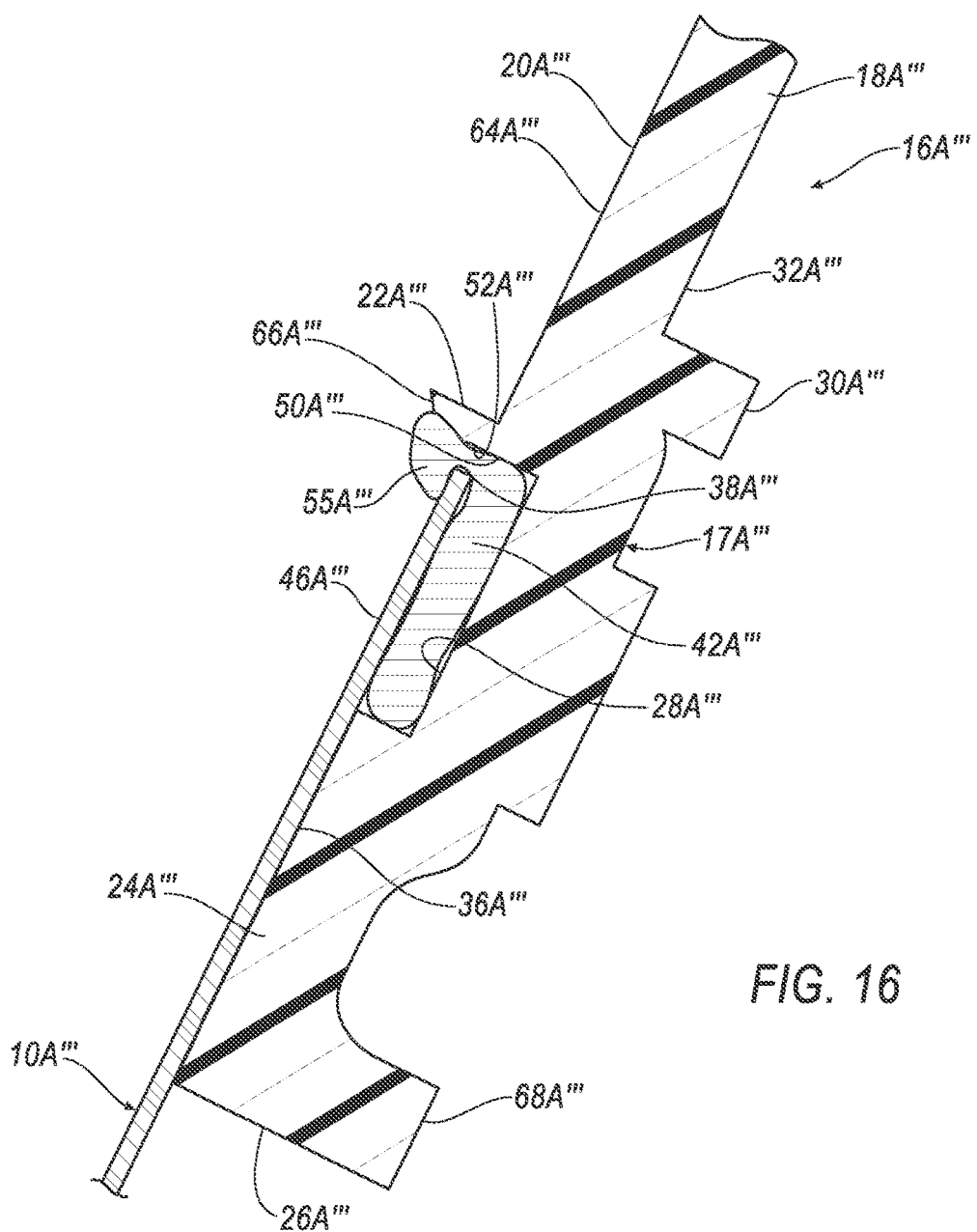
FIG. 16 is a sectional side view of the plug and panel of FIG. 12 after heating.
Figure 17:
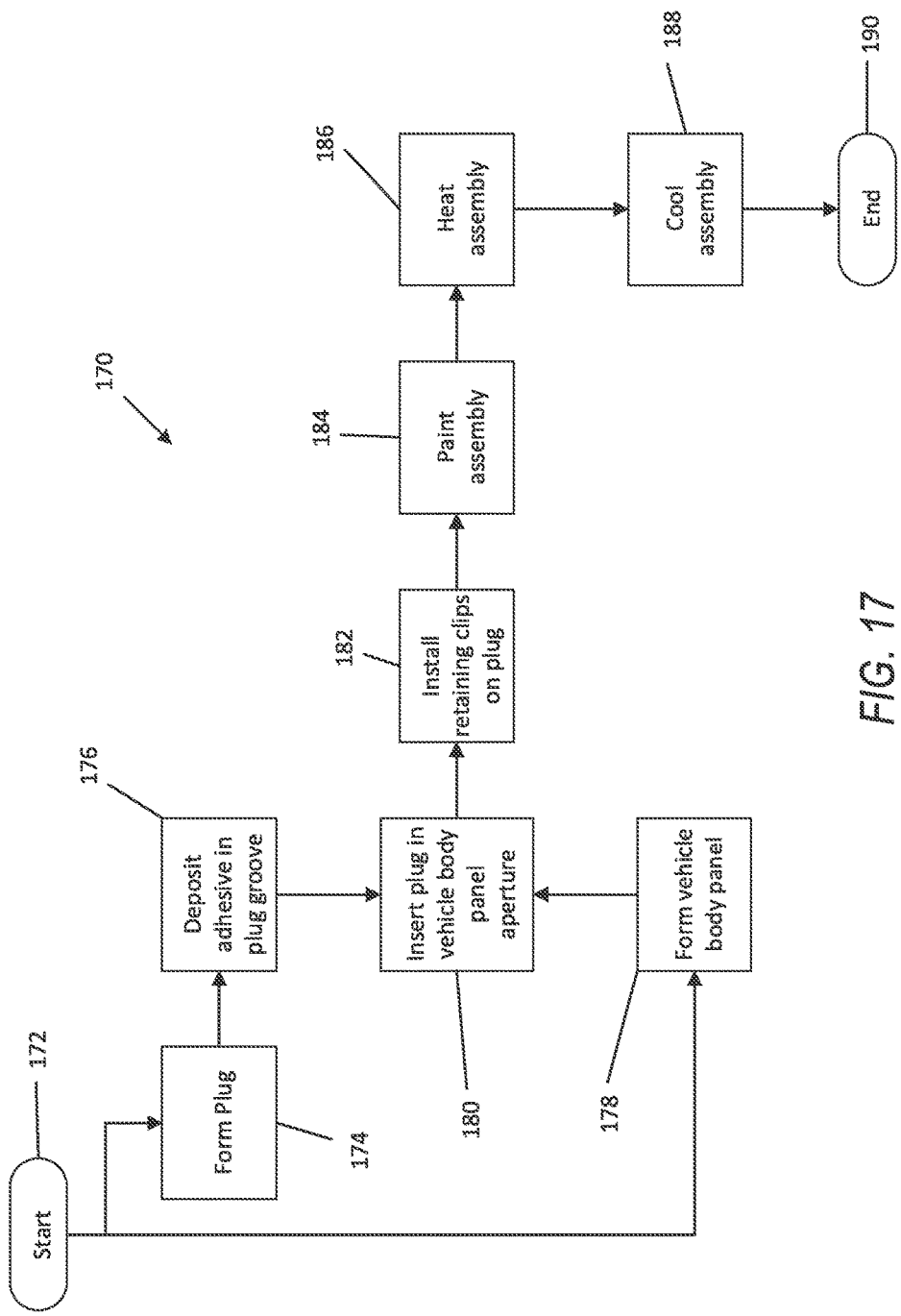
FIG. 17 is a flow chart for an exemplary process.

Exemplary plug 17A''' is similar to plug 17. As plug 17A''' is used on a different body panel and as aperture 12A''' is of a different size and shape than aperture 12, plug 17A''' has a different size and shape than plug 17. Plug 17A''' may also be distinguished over plug 17 in that plug 17A''' has a plurality of ribs 30A''' on a second side 32A''' of a base 18A''' instead of a first side 20A''' of base 18A'''. First side 20A''' may have a relatively wider adhesive receiving groove 28A''' in lip portion 24A''' to accommodate a wider deposit or forming of adhesive 42A''' as illustrated in FIG. 15. A flange 22A''' extends above lip portion 24A''' and aid in directing expanded adhesive 42A''' over lip portion 34A''. Adhesive 42A''' expands and flows through a flow channel 50A''' that includes a gap 52A''' between an inner perimeter 38A''' of aperture 12A''' and flange 22A''. Escaping channel 50A''', adhesive 42A''' flows over a second side 46A''' of a body panel 10' forming a retaining stitch 55'. Plug 17A''' may be optionally provided without a flange 22A''' if an interior surface 64A''' inside of groove 28A''' is made level with a desired flange height. A plurality of barbs 66A'', four in number in the FIGS. 10-17, may be provided to engage a second side 42A''' of body panel 10A'''. Although not illustrated, plug 17A''' may include spacer bars to control positioning of plug 17A''' within aperture 12A'''. Barbs 66A'', like flange 22 and spacer bars 56' and 56'' may, at least in part, define a locating surface 70A''' to aid in positioning of plug 17A''' within aperture 12A'''. An outer perimeter rib 68A' is provided at an outer perimeter 26A''' of base 18A'''. Rib 68A''' prevents curling of lip portion 24A''' during and after heating the assembled plug 17A''' and panel 10A'''.

A method or process 170 of repurposing or converting a non-autonomous vehicle body to an autonomous vehicle body is illustrated in FIG. 18. Method 170 is initiated with step 172, and then progresses to steps 174 and 178. Steps 174 and 176 may be performed in parallel with step 178. In step 174, plugs 17, 17', 17'', 17A''' are formed. Plugs 17, 17', 17'', 17A''' may be formed by any appropriate method including molding and three-dimensional printing. In step 176, adhesive 42, 42', 42'', 42A''' is disposed in receiving grooves 28, 28', 28'', 28A''' of plugs 17, 17', 17'', 17A'''. Any suitable type of dispenser may be used for depositing adhesive 42, 42', 42'', 42A''' in receiving grooves 28, 28', 28'' 28A'''. In step 178, body panels 10, 10', 10'', 10A''' are formed. Body panels 10, 10', 10'', 10A''' may be formed of metal by stamping sheet metal with presses. Alternatively, if body panels 10, 10', 10'', 10A''' are formed of carbon fiber or glass fiber reinforced polymer, panels 10, 10', 10'', 10A''' may be formed by molding. Panels 10, 10', 10'', 10A''' may further be assembled into a vehicle body. In step 180, plugs 17, 17', 17'', 17A''' are inserted into body apertures 12, 12', 12'', 12A'''. Excessive resistance of plugs 17, 17', 17'' entering apertures 12, 12', 12'' may be indicative of lip portion 24, 24', 24'' not properly engaging lip portion 34, 34', 34''. Plugs 17A' are an exception to this in that the resistance of barbs 66A''' passing through aperture 12A''' must be overcome with barbs 66A''' engaging second side 46A''' when plug 17A''' is properly inserted. In step 182, for plugs 17, 17' and 17'', retaining clips 43, 43', 43'' may be installed over flanges 22, 22', 22''. Clips 43, 43', 43'' may be installed by pushing them over flanges 22, 22', 22'' so that the spring ends of clips 43, 43', 43'' are in biasing engagement with second sides 46, 46', 46'' and the barbs are in substantially fixed engagement with flanges 22, 22', 22''. In step 184, assembled plugs 17, 17', 17'', 17A''' and body panels 10, 10', 10'', 10A''' may be painted. Any suitable equipment may be employed for painting. Painting may include applications of a primer coat, a color coat and a clear coat. In step 186, a painted assembly of plugs 17, 17', 17'', 17A''' and body panels 10, 10', 10'', 10A''' and adhesive 42, 42', 42'', 42A''' and, for systems 16, 16', 16'', clips 43, 43, 43'' is subjected to heating by heating equipment such as an oven. Heating may occur after each coat of paint or after just certain coats of paint. The heating cures the paint and sets the adhesive, and causes the adhesive to expand. In step 188, the assembly is allowed to cool. The process then terminates with step 190. Process 170 can be conducted on individual body panels or on body panels assembled into a vehicle body.

The described components, systems and processes have multiple benefits. For example, with the embodiment of FIGS. 1-5, having the close fitting relationship between lip portion 34 and flange 22 forces adhesive 42 to expand inside of otherwise unused apertures 13, provides more than one shear plane of adhesion. The above-described plug and body conversion system allow the use of existing body components and build fixturing and minimize body shop complexity when building bodies for both non-autonomous vehicles and autonomous vehicles. It avoids a need to develop separate body component tooling and fixturing specific to autonomous vehicles. This enables manufacturers having a wide variety of non-autonomous vehicle platforms to offer autonomous vehicle versions of such platforms. This use of structural adhesives, such as thermally expandable structural adhesive, permanently affixes the plugs to the vehicle. This prevents customers from modifying the vehicle taking an autonomous vehicle and retrofitting it with driver controls.

The term vehicle as used herein may include any passenger or commercial automobile such as a car, a truck, a sport utility vehicle, a crossover vehicle, a van, a minivan, a taxi, a bus, etc.

CONCLUSION

A plug and a system and a method for converting a non-autonomous vehicle body to an autonomous vehicle body has been disclosed.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their plain and ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A plug for a body aperture in a vehicle body, the plug comprising:
    a base shaped and sized to completely overlap the aperture;
    a locating surface defined by a flange on a first side of the base, the locating surface extending substantially normal to the base and being complementary in shape to the aperture;
    a lip portion of the base connecting the locating surface with an outer perimeter of the base;
    a receiving groove in the lip portion; and
    a rib disposed on the first side of the base and elongated between distal ends, the distal ends abutting the flange;
    wherein the receiving groove is configured to align with a plurality of fastener apertures surrounding the body aperture such that adhesive extends from the groove through the plurality of fastener apertures.

2. A plug as claimed in claim 1, wherein a thermally expanding adhesive is disposed in the receiving groove.

3. A plug as claimed in claim 2, wherein the adhesive extends beyond at least one of the plurality of fastener apertures and forms a cap opposite the receiving groove.

4. A plug as claimed in claim 1, wherein the receiving groove is circumferentially continuous around the lip portion.

5. A plug as claimed in claim 1, further comprising a second rib disposed on the first side of the base and elongated perpendicular to the rib between second distal ends, the second distal ends abutting the flange.

6. A plug as claimed in claim 1, wherein a flow channel extends from the groove to the flange and the flange is sized to define a gap relative to the body aperture sized for communication of the adhesive therepast.

7. A plug as claimed in claim 1, wherein the receiving groove is configured to align with the plurality of fastener apertures such that the adhesive extends beyond at least one of the plurality of fastener apertures and forms a cap opposite the receiving groove.

8. A body conversion system comprising:
    a vehicle body panel having a body aperture disposed therein and a plurality of fastener apertures spaced around the body aperture;
    a plug received by the body aperture, the plug including:
    a base shaped and sized to completely overlap the aperture,
    a locating surface defined by a flange on a first side of the base, the locating surface extending substantially normal to the base and being complementary in shape to the aperture,
    a lip portion of the base connecting the locating surface with an outer perimeter of the base and in engagement with a first side of the body panel,
    a rib disposed on the first side of the base and elongated between distal ends, the distal ends abutting the flange, and
    a receiving groove in the lip portion and aligned with the plurality of fastener apertures; and
    an adhesive disposed in the receiving groove, the adhesive extending through the plurality of fastener apertures.

9. A body conversion system as claimed in claim 8 wherein the receiving groove is circumferentially continuous around the lip portion.

10. A body conversion system as claimed in claim 8, further a second rib disposed on the first side of the base and elongated perpendicular to the rib between second distal ends, the second distal ends abutting the flange.

11. A body conversion system as claimed in claim 8, wherein a flow channel extends from the groove to the flange and the flange is sized to define a gap relative to the body aperture sized for communication of the adhesive therepast.

12. A body conversion system as claimed in claim 8, further comprising a plurality of retaining clips having a first feature in substantially fixed engagement with the flange and a second feature in a biasing engagement with a second side of the body panel opposite the first side of the body panel.

13. A body conversion system as claimed in claim 8, wherein the adhesive extends beyond at least one of the plurality of fastener apertures and forms a cap opposite the receiving groove.

14. A method of repurposing a non-autonomous vehicle body to an autonomous vehicle body comprising the steps of:
    forming a body panel including a body aperture;
    forming a plug including:
    a base shaped and sized to completely overlap the aperture,
    a locating surface defined by a flange on a first side of the base, the locating surface extending substantially normal to the base and being complementary in shape to the aperture
    a lip portion of the base connecting the locating surface with an outer perimeter of the base and in engagement with a first side of the body panel, a rib disposed on the first side of the base and elongated between distal ends, the distal ends abutting the flange, and a receiving groove in the lip portion; and an adhesive disposed in the receiving groove;

placing the plug in the aperture;

then installing a plurality of retaining clips on the flange after the flange has been placed in the aperture and before heating; and then heating the plug and the body panel in an area of engagement between the plug and the body panel.

15. A method as claimed in claim 14, wherein the plug further includes a receiving groove that is circumferentially continuous around the lip portion.

16. A method as claimed in claim 14, wherein the body panel includes a plurality of fastener apertures spaced around the body aperture and the receiving groove aligns with the fastener apertures.

17. A method as claimed in claim 14, wherein a second rib is disposed on one of the first side of the base and a second side of the base opposite the first side of the base, the second rib elongated perpendicular to the rib between second distal ends.

18. A method as claimed in claim 17, wherein the locating surface is defined at least in part by a plurality of barbs formed on the first side of the base and the barbs are pushed past the aperture and engage a second side of the body panel opposite the first side.

19. A method as claimed in claim 14, wherein a flow channel extends from the groove to the flange and the flange is sized to define a gap relative to the body aperture sized for communication of the adhesive therepast.

20. A method as claimed in claim 14, further comprising the steps of:

painting assembled body panel and plug after installing the retaining clips and before heating; and heating the plug and body panel in a paint cure oven.

* * * * *